United States Patent
Huang et al.

(10) Patent No.: US 7,974,306 B2
(45) Date of Patent: Jul. 5, 2011

(54) SIGNAL TRANSFERRING DEVICE

(75) Inventors: Chien-Hua Huang, Caotun Township, Nantou County (TW); Wen-Hung Wang, Caotun Township, Nantou County (TW); Li-Chi Chiu, Caotun Township, Nantou County (TW)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 154 days.

(21) Appl. No.: 12/205,852

(22) Filed: Sep. 6, 2008

(65) Prior Publication Data

US 2010/0061397 A1 Mar. 11, 2010

(51) Int. Cl.
*H04L 12/66* (2006.01)
(52) U.S. Cl. ......................... 370/463; 370/252; 370/248
(58) Field of Classification Search .................. 370/463, 370/328; 455/464, 426, 452, 450, 436; 710/100, 710/62, 305, 315
See application file for complete search history.

(56) References Cited

U.S. PATENT DOCUMENTS

| 4,751,606 A * | 6/1988 | Matsko et al. ............... 361/93.2 |
| 2004/0185825 A1* | 9/2004 | Preiss et al. .................. 455/405 |
| 2007/0010132 A1* | 1/2007 | Nelson et al. ................. 439/577 |
| 2008/0136716 A1* | 6/2008 | Annamaa et al. ............. 343/702 |
| 2008/0183303 A1* | 7/2008 | West ............................... 700/2 |
| 2010/0073856 A1* | 3/2010 | Huang et al. ............. 361/679.21 |

* cited by examiner

*Primary Examiner* — Chi H Pham
*Assistant Examiner* — Kouroush Mohebbi
(74) *Attorney, Agent, or Firm* — Chun-Ming Shih

(57) ABSTRACT

A signal transferring device adapted to connect to a communication device via a network cable, includes a network port, a third port, a decoder circuit and a signal strength indicator unit. The network port is connected to a communication device via a network cable. The third port is different from the network port and connected to a plurality of signal lines and a ground line of a main board of the communication device via the network port. The decoder circuit is connected to a power line, a ground line and at least one first control line of the main body to receiving a signal in relation to a signal receiving strength state of the communication device for generating a signal strength indicator signal. The signal strength indicator unit is connected to the decoder circuit and configured for displaying the signal receiving strength state of the communication device.

9 Claims, 3 Drawing Sheets

SIGNAL TRANSFERRING DEVICE

BACKGROUND

1. Field of the Invention

The present invention relates to the communication technology field, and more specifically, to a signal transferring device adapted to connect to a communication device.

2. Description of the Related Art

Currently, with the rapid development of the network, various communication devices (for example, WiMax wireless communication device) adapted into the Ethernet to be as data transmission interfaces, are widely used. The communication devices usually have a plurality of RJ-45 ports as input/output interfaces for electronic power and data signals.

After manufacturing the communication devices, if they need to be examined, repaired or controlled by commands, a computer needs to detect the state of the communication devices. The conventional communication devices do not have any interface in advance or only have an RS-232 arranged on the shell thereof as the interface to communicate with the computer. However, the communication devices are arranged high and the data transmission distance of the RS-232 is short, thus the communication devices are inconveniently in the erecting and/or repairing processes, and cost long erecting and/or repairing time.

What is needed, is providing a signal transferring device, which can solve the above problems.

BRIEF SUMMARY

A signal transferring device in accordance with an exemplary embodiment of the present invention, is provided. The signal transferring device is adapted to connect to a communication device via a network cable. The communication device includes a first network port and a main board having a power line, a ground line, at least one first control line and a plurality of signal lines. The power line, the ground line, the at least one first control line and the plurality of signal lines are connected to the first network port. The signal transferring device includes a second network port, a third port, a decoder circuit and a signal strength indicator unit. The second network port is connected to the first network port via the network cable. The third port is different from the second network port, and connected to the plurality of signal lines and the ground line via the second network port. The decoder circuit is connected to the power line, the ground line and the at least one first control line via the second network port. The decoder circuit is configured for receiving a signal in relation to a signal receiving strength state of the communication device to generate a signal strength indicator signal. The signal strength indicator unit is connected to the decoder circuit and configured for receiving the signal strength indicator signal to display the signal receiving strength state of the communication device.

Preferably, the second network port is an RJ-45 port.

Preferably, the third port is a serial port, and the serial port may be an RS-232 port.

Preferably, the main board further includes a second control line, the signal transferring device further includes a buzzer circuit. The buzzer circuit is connected to the second control line, the power line and the ground line via the second network port for being controlled by the second control line.

The present signal transferring device employs the network port to transfer the signals of the communication device to the computer via the network cable, such that the communication device can be communicated with the computer in a long distance. Furthermore, the present signal transferring device can display the signal receiving strength state of the communication device because of the circuit frame of the signal transferring device and the corresponding circuit frame of the main board of the communication device. Therefore, the present signal transferring device makes to erect and/or repair the communication device conveniently, and the erecting and/or repairing time for the communication device are decreased.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present signal transferring device, in detail. The following description is given by way of example, and not limitation.

Figure 1:
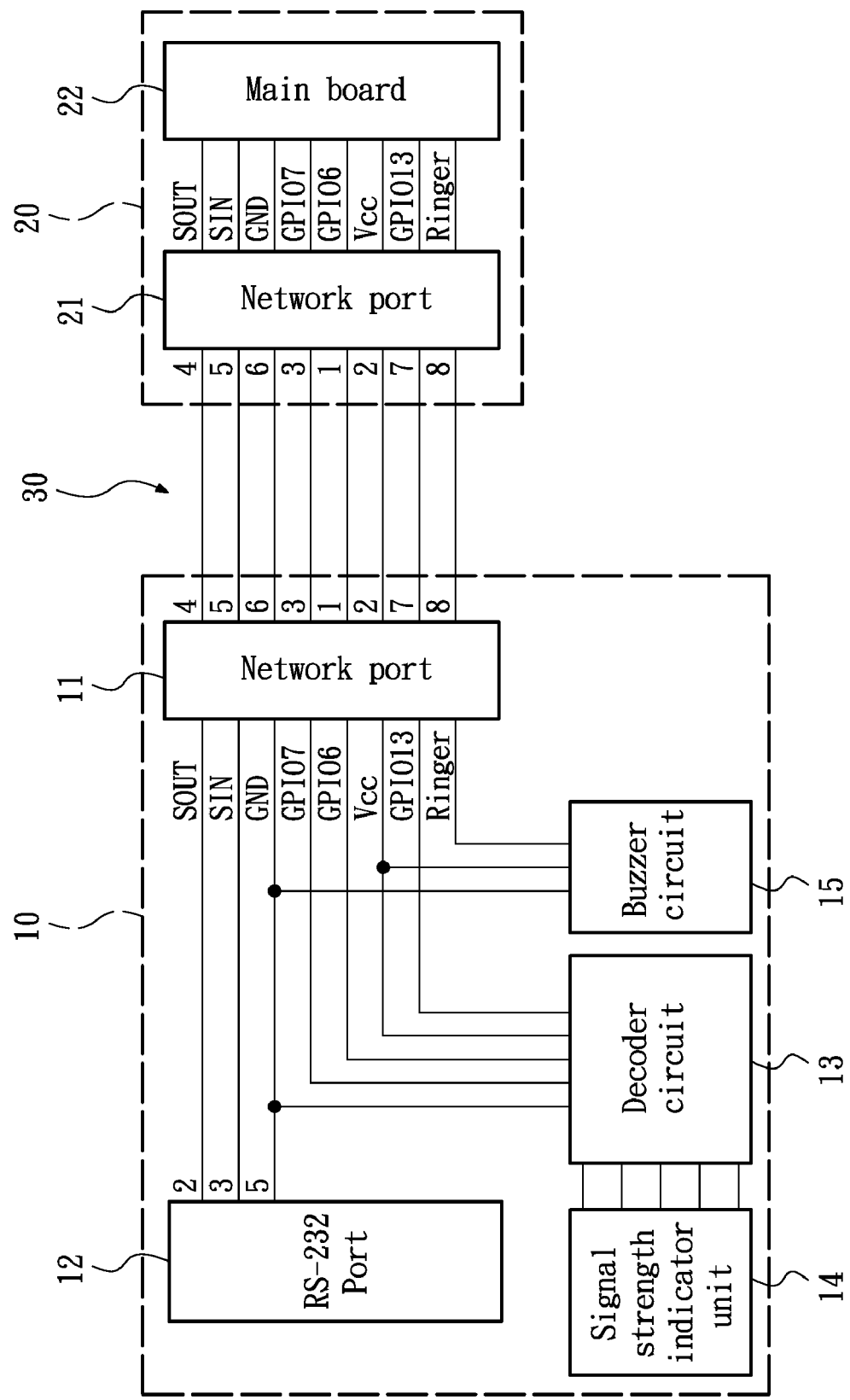
FIG. 1 is a schematic, frame block diagram of a signal transferring device communicated to a communication device via a network cable, in accordance with an exemplary embodiment of the present invention.

Referring to FIG. 1, a signal transferring device in accordance with an exemplary embodiment of the present invention, is provided. The signal transferring device 10 is adapted to connect to a communication device 20 via a network cable 30, such that signals of the communication device 20 can be transferred into a computer (not shown) to communicate the communication device 20 with the computer in a long distance. The communication device 20 includes a network port 21 and a main board 22. The main board 22 has two signal lines SIN and SOUT, a ground line GND, three first control lines GPIO6, GPIO 7 and GPIO 13, a power line Vcc and a second control line Ringer. The signal lines SIN and SOUT, the ground line GND, the first control lines GPIO6, GPIO 7 and GPIO13, the power line Vcc and the second control line Ringer are connected to the network port 21. The communication device 20 may be a wire communication device or a wireless communication device, and the wireless communication device may be a WiMAX wireless communication device.

The signal transferring device 10 includes a network port 11 (for example, RJ-45 port), a third port 12 (for example, RS-232 port), a decoder circuit 13, a signal strength indicator unit 14 and a buzzer circuit 15. The third port 12 is connected to the signal lines SIN and SOUT, and the ground line GND of the main board 22 via the network port 11. The decoder circuit 13 is connected to the first control lines GPIO6, GPIO7 and GPIO 13, the ground line GND and the power line Vcc of the main board 22 via the network port 11 for receiving a signal in relation to a signal receiving strength state of the communication device 20 provided from the first control lines GPIO6, GPIO7 and GPIO 13 to generate a signal strength indicator signal. The signal strength indicator unit 14 is connected to the decoder circuit 13 for receiving the signal strength indicator signal to display the signal receiving strength state of the communication device. The buzzer circuit 15 is connected to the second control line Ringer, the power line Vcc and the ground line GND of the main board 22 via the network port 11 for being controlled by the second control line Ringer to send out an alert.

Figure 2:
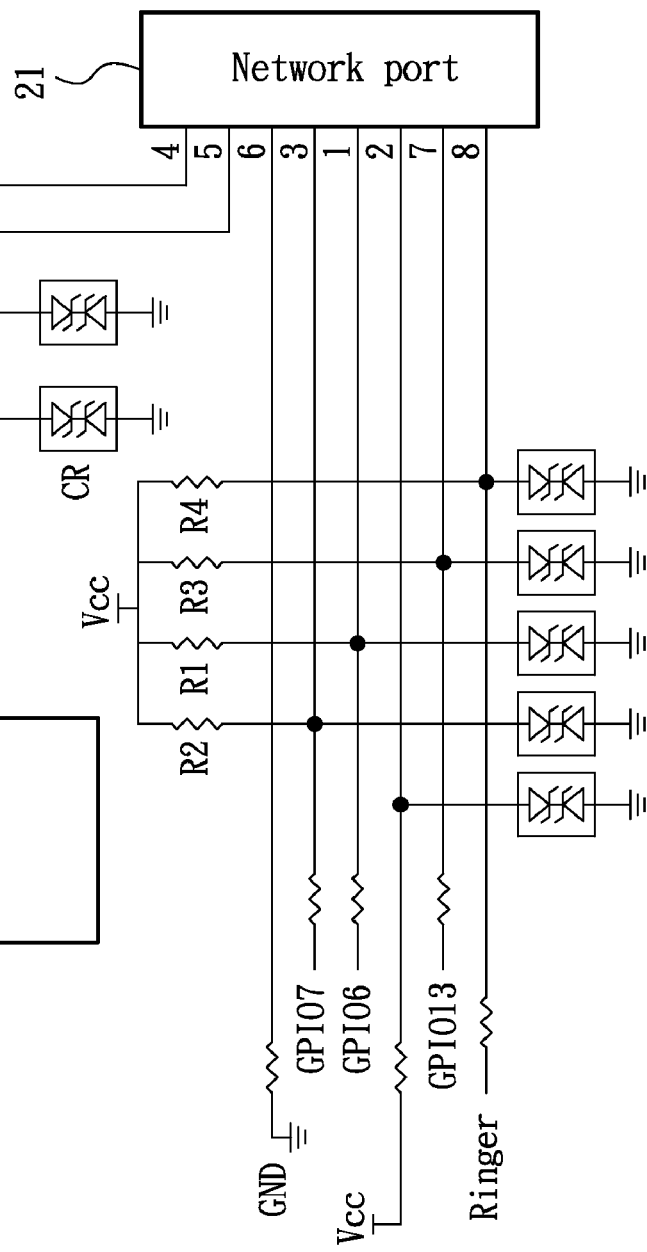
FIG. 2 is a partial circuit diagram of a main board of the communication device as shown in FIG. 1.

Referring to FIG. 2, a part circuit of the main board 22 of the communication device 20 is shown. The main board 22 includes a level shifter 221, a plurality of transient voltage suppressors CR and a plurality of pull-up resistors R1, R2, R3 and R4. The signal lines SOUT and SIN are connected to pins 4 and 5 of the network port 21 respectively via the level shifter 221. Furthermore, the signal lines SOUT and SIN are connected to the ground line GND via a transient voltage suppressor CR respectively. The level shifter 221 is configured for shifting the voltage level of the signals provided from the signal lines SIN and SOUT, such that the signals are adapted to be transmitted in the network cable 30. The level shifter 221 corresponds to the third port 12. For example, the level shifter 221 may be an RS-232 level shifter if the third port 12 is an RS-232 port. The first control lines GPIO6, GPIO7, GPIO13 and the second control line Ringer are connected to pins 1, 3, 7, and 8 of the network port 21 respectively, and are connected to the power line Vcc via the pull-up resistors R1, R2, R3 and R4 respectively. Furthermore, the first control lines GPIO6, GPIO7, GPIO13 and the second control line Ringer are connected to the ground line GND via a transient voltage suppressor CR respectively. The power line Vcc is connected to a pin 2 of the network port 21, and the ground line GND is connected to a pin 6 of the network port 21.

Figure 3:
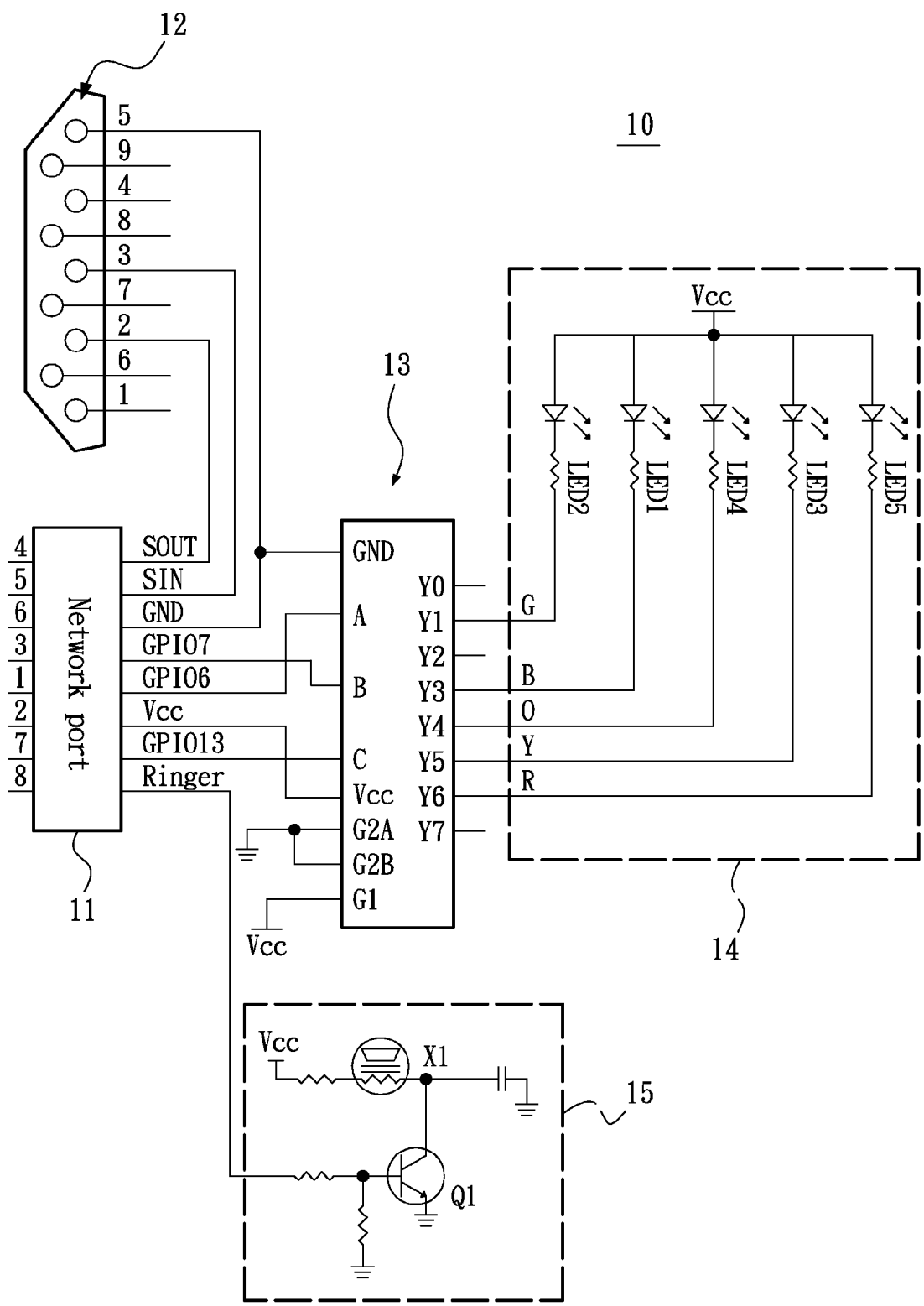
FIG. 3 is a circuit diagram of the signal transferring device as shown in FIG. 1.

Referring to FIG. 3, the circuit of the signal transferring device 10 is shown. As shown in FIG. 3, the third port 12 is an RS-232 port. Pins 2, 3, 5 of the third port 12 are connected to pins 4, 5, 6 of the network port 11 respectively to couple to the signal lines SOUT, SIN and the ground line GND of the main board 22 respectively. The decoder circuit 13 is a 3-to-8 line decoder. Input terminals A, B, C, a power terminal and a ground terminal of the 3-to-8 line decoder are connected to pins 1, 3, 7, 2, and 6 of the network port 11 respectively to couple to the first control lines GPIO6, GPIO7, GPIO13, the power line Vcc and the ground line GND. Output terminals Y3, Y1, Y5, Y4 and Y6 are connected to light-emitting elements LED1, LED2, LED3, LED4 and LED5 of the signal strength indicator unit 14 respectively. The light-emitting elements LED1, LED2, LED3, LED4 and LED5 are light-emitting diodes configured for emitting different colors, such as blue (B), green (G), yellow (Y), orange (O) and red (R) light-emitting diodes. The light-emitting elements LED1, LED2, LED3, LED4 and LED5 are used for representing grades of the signal strength, such as excellent, good, ordinary, bad and fail, when they are turned on to emit the light. Alternatively, the light-emitting elements LED1, LED2, LED3, LED4 and LED5 may be light-emitting diodes with same color to represent the grades of the signal strength by using the amount of turned-on light-emitting diodes. The buzzer circuit 15 includes a transistor Q1, a buzzer X1 and indispensable capacitors and resistors. The gate terminal of the transistor Q1 is connected to a pin 8 of the network port 11 to couple to the second control line Ringer of the main board 22. The drain terminal of the transistor Q1 is connected to the buzzer X1. The transistor Q1 is configured for turning on/off the signals.

It should be noted, the third port 12 is not limited to be the RS-232 port described in the above, and it also may be a serial port, such as a RS-422 port, or another suited port. The amount of the light-emitting elements of the signal strength indicator unit 14 is not limited to be five described in the above, and is determined by the amount of the first control lines. That is, if the amount of the first control lines of the main board 22 of the communication device 20 is not limited to be three, and it may be one or two, the decoder circuit 13 and/or the buzzer circuit 15 should be changed correspondingly.

The present signal transferring device employs the network port to transfer the signals of the communication device to the computer, such that the communication device can be communicated with the computer in a long distance. Furthermore, the present signal transferring device can display the signal receiving strength state of the communication device because of the circuit frame of the signal transferring device and the corresponding circuit frame of the main board of the communication device. Therefore, the present signal transferring device makes to erect and/or repair the communication device conveniently, and the erecting and/or repairing time for the communication device are decreased.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A signal transferring device adapted to connect to a WiMAX wireless communication device via a network cable, the WiMAX wireless communication device including a first network port and a main board having a power line, a ground line, at least one first control line and a plurality of signal lines, the power line, the ground line, the at least one first control line and the plurality of signal lines being connected to the first network port, the signal transferring device comprising:
a second network port connected to the first network port via the network cable;
a third port different from the second network port and directly connected to the second network port for receiving signals from the plurality of signal lines and the ground line;
a decoder circuit directly connected to the second network port for receiving signals from the power line, the ground line and the at least one first control line, the decoder circuit being configured for receiving a signal in relation to a signal receiving strength state of the WiMAX wireless communication device provided by the at least one first control line to generate a signal strength indicator signal; and
a signal strength indicator unit connected to the decoder circuit and configured for receiving the signal strength indicator signal to display the signal receiving strength state of the WiMAX wireless communication device.

2. The signal transferring device as claimed in claim 1, wherein the second network port is an RJ-45 port.

3. The signal transferring device as claimed in claim 1, wherein the third port is a serial port.

4. The signal transferring device as claimed in claim 3, wherein the serial port is an RS-232 port.

5. The signal transferring device as claimed in claim 1, wherein the at least one first control line are three first control lines, and the decoder circuit includes a 3-to-8 line decoder.

6. The signal transferring device as claimed in claim 1, wherein the signal strength indicator unit includes a plurality of light-emitting diodes.

7. The signal transferring device as claimed in claim 1, wherein the main board further includes a second control line, the signal transferring device further includes a buzzer circuit; the buzzer circuit is connected to the second control line, the power line and the ground line via the second network port for being controlled by the second control line.

8. The signal transferring device as claimed in claim 1, wherein the main board further includes a level shifter, the plurality of signal lines are connected to the first network port via the level shifter.

9. The signal transferring device as claimed in claim 8, wherein the level shifter is an RS-232 level shifter.

* * * * *